US009793544B2

United States Patent
Yamamoto et al.

(10) Patent No.: US 9,793,544 B2
(45) Date of Patent: Oct. 17, 2017

(54) METHOD OF MANUFACTURING POSITIVE ELECTRODE MATERIAL FOR LITHIUM ION SECONDARY BATTERY, POSITIVE ELECTRODE MATERIAL FOR LITHIUM ION SECONDARY BATTERY, POSITIVE ELECTRODE FOR LITHIUM ION SECONDARY BATTERY AND LITHIUM ION SECONDARY BATTERY

(71) Applicant: SUMITOMO OSAKA CEMENT CO., LTD., Tokyo (JP)

(72) Inventors: Kazuyo Yamamoto, Tokyo (JP); Ryuuta Yamaya, Tokyo (JP); Akinori Yamazaki, Tokyo (JP)

(73) Assignee: SUMITOMO OSAKA CEMENT CO., LTD. (JP)

( * ) Notice: Subject to any disclaimer, the term of this patent is extended or adjusted under 35 U.S.C. 154(b) by 0 days.

(21) Appl. No.: 14/939,608

(22) Filed: Nov. 12, 2015

(65) Prior Publication Data

US 2016/0226066 A1    Aug. 4, 2016

(30) Foreign Application Priority Data

Jan. 30, 2015  (JP) ................................ 2015-017133

(51) Int. Cl.
| | |
|---|---|
| *H01M 10/052* | (2010.01) |
| *H01M 4/58* | (2010.01) |
| *H01M 4/131* | (2010.01) |
| *C01B 25/45* | (2006.01) |
| *H01M 10/0525* | (2010.01) |

(52) U.S. Cl.
CPC ............ *H01M 4/5825* (2013.01); *C01B 25/45* (2013.01); *H01M 4/131* (2013.01); *C01P 2004/45* (2013.01); *C01P 2004/60* (2013.01); *H01M 10/0525* (2013.01)

(58) Field of Classification Search
CPC .......... H01M 10/0525; H01M 10/052
See application file for complete search history.

(56) References Cited

FOREIGN PATENT DOCUMENTS

| | | |
|---|---|---|
| JP | A-2001-015111 | 1/2001 |
| JP | A-2004-014340 | 1/2004 |
| JP | A-2004-014341 | 1/2004 |
| JP | A-2006-032241 | 2/2006 |
| JP | A-2009-038013 | 2/2009 |
| JP | A-2009-048958 | 3/2009 |
| JP | A-2011-082133 | 4/2011 |
| WO | WO 2013/039129 A1 | 3/2013 |
| WO | WO 2013/148809 A1 | 10/2013 |

OTHER PUBLICATIONS

Jo et al. (Journal of Power Sources 216 (2012) 162-168).*
Porcher et al. (Journal of Power Sources 195 (2010) 2835-2843).*
Wang et al. (Journal of Alloys and Compounds 509 (2011) 1040-1044).*
Nakamura et al. (Journal of The Electrochemical Society, 157 (4) A544-A549 (2010)).*
Office Action for Japanese Patent Application No. 2015-017133 (dated Aug. 18, 2015).

* cited by examiner

*Primary Examiner* — Olatunji Godo
(74) *Attorney, Agent, or Firm* — Merchant & Gould P.C.

(57) ABSTRACT

A method of manufacturing the positive electrode material for a lithium ion secondary battery includes a first step of mixing $Li_3PO_4$, $LiOH$, $H_3PO_4$, an Fe source, a Mn source, and an M source to prepare raw material slurry, and a second step of subjecting the raw material slurry to a reaction under a high temperature and a high pressure. In the first step, mixing amounts of Li and P are set to $3.00 \leq Li/(Fe+Mn+M) \leq 3.10$ and $1.00 \leq P/(Fe+Mn+M) \leq 1.10$, mixing amounts of LiOH and $H_3PO_4$ are set to $0 < LiOH/(Fe+Mn+M) < 0.40$ and $0 < H_3PO_4/(Fe+Mn+M) < 0.15$, the amount of $Li_3PO_4$, LiOH, $H_3PO_4$, the Fe source, the Mn source and the M source in the raw material slurry is set to 0.5 to 1.5 mol/L in terms of $LiFe_xMn_{1-x-y}M_yPO_4$, and pH of the raw material slurry is set to 4.0 to 5.5.

7 Claims, No Drawings

METHOD OF MANUFACTURING POSITIVE ELECTRODE MATERIAL FOR LITHIUM ION SECONDARY BATTERY, POSITIVE ELECTRODE MATERIAL FOR LITHIUM ION SECONDARY BATTERY, POSITIVE ELECTRODE FOR LITHIUM ION SECONDARY BATTERY AND LITHIUM ION SECONDARY BATTERY

TECHNICAL FIELD

The present invention relates to a method of manufacturing a positive electrode material for a lithium ion secondary battery, a positive electrode for a lithium ion secondary battery and a lithium ion secondary battery.

Priority is claimed on Japanese Patent Application No. 2015-017133, filed on Jan. 30, 2015, the content of which is incorporated herein by reference.

BACKGROUND ART

Recently, new technology has rapidly developed to achieve a clean energy society. Great efforts have been made to achieve earth-friendly society. For example, efforts have been made which aim to achieve a petroleum-free society and zero emission, and spread of power saving products. Particularly, batteries have been recently in the spotlight such as a storage battery which is capable of storing a large quantity of electricity to transfer energy to and from an electric vehicle or to transfer energy during the occurrence of disaster and emergency, and a secondary battery that is used in a portable electronic apparatus. Examples of such batteries that have been known include a lead storage battery, an alkali storage battery, a lithium ion secondary battery and the like. Particularly, the lithium ion secondary battery is capable of realizing high capacity and a reduction in size and weight. Furthermore, the lithium ion secondary battery has excellent characteristics such as high output and a high energy density, and thus the lithium ion secondary battery has been commercialized as a high-output power supply of an electric vehicle, an electromotive tool and the like. Further, development of a material for a next generation lithium ion secondary battery is actively in progress in the world. In addition, as an example of collaboration with a house and a battery, a home energy management system (HEMS) is known. Further, attention has been gained to a system that can wisely consume energy through management of automatic control, optimization of supply and demand of electric power and the like, and such a management is performed by integrating a control system and information relating to home electricity such as the smart home appliance, the electric vehicle, solar cell power generation and the like.

Typical examples of a positive electrode active material for the lithium ion secondary battery, which has been put into practical use under these circumstances, include $LiCoO_2$ and $LiMnO_2$. However, Co is unevenly distributed on the earth, and is a rare resource. Accordingly, there are concerns that it is difficult to stably supply Co and the product cost rises when a large amount of Co is used. Therefore, research and development of a positive electrode active material, which can be used instead of $LiCoO_2$, have been actively in progress such as spinel-type $LiMn_2O_4$, ternary $LiNi_{1/3}Mn_{1/3}Co_{1/3}O_2$, lithium iron oxide ($LiFeO_2$) and lithium iron phosphate ($LiFePO_4$) as a positive electrode active material.

Among these positive electrode active materials, $LiFePO_4$, which has an olivine structure, has attracted attention, as $LiFePO_4$ is inexpensive, high in stability and rich in deposits.

The olivine-type positive electrode active material, which is represented by $LiFePO_4$, contains phosphorus as a constituent element, and thus phosphorous and oxygen are connected by a strong covalent bond. Accordingly, $LiFePO_4$ is a material which is excellent in stability. The reason is that oxygen is not released from $LiFePO_4$ at a high temperature unlike a positive electrode active material such as $LiCoO_2$, and there is no firing risk since oxidative decomposition of an electrolytic solution does not occur.

However, even in $LiFePO_4$ having the above-described advantages, there is a problem with low electron conductivity. The cause of the problem is considered such that diffusion speed of lithium ions is slow at the inside of $LiFePO_4$ and therefore electron conductivity is low, and such a diffusion speed is originated from a molecular structure thereof.

As a positive electrode material in which the electron conductivity is improved, for example, a positive electrode material is disclosed in which a plurality of primary particles of the positive electrode active material composed of $Li_xA_yB_zPO_4$ (provided that, A represents at least one selected from the group consisting of Co, Mn, Ni, Fe, Cu and Cr, B represents at least one selected from the group consisting of Mg, Ca, Sr, Ba, Ti, Zn, B, Al, Ga, In, Si, Ge, Sc, Y, and a rare-earth element, and relationships of $0<x\leq2$, $0<y\leq1$, and $0\leq z\leq1.5$ are satisfied) are aggregated to form secondary particles, carbon as an electron conductive material is interposed between the primary particles, and a surface of the positive electrode active material is coated with a carbonaceous film. Further, with regard to the positive electrode material that is manufactured by spraying and drying slurry containing a positive electrode active material or a precursor of the positive electrode active material and an organic compound to prepare a granule, and subjecting the granule to a heat treatment under a non-oxidizing atmosphere at 500° C. to 1000° C., methods are disclosed wherein electron conductivity of a carbonaceous film is improved by increasing a density of the granule to coat the surface of the positive electrode active material with the carbonaceous film having a uniform thickness (for example, refer to Patent documents 1 to 5).

When the aforementioned positive electrode materials which have improved electron conductivity are used for a battery, an improvement in an initial battery capacity is reliably observed. However, deterioration in the battery capacity is also observed when the battery is maintained for a long period of time in a charged state, or with respect to cycle characteristics in which charge and discharge are repetitively carried out. Accordingly, there is a demand for an improvement in durability.

In order to improve the durability, for example, a method is disclosed wherein a compound, which is composed of at least one of sulfur (S), phosphorus (P) and fluorine (F), is adhered to a surface of composite oxide particles (for example, refer to Patent document 6).

However, the method is not preferable as a method of improving the durability, since a gas is generated in the method due to the above-described compound and thus a battery is expanded, or the compound covers a surface of the electrode and thus the electron conductivity is inhibited.

It is considered that the deterioration in the durability is caused by metal impurities which are eluted to an electrolytic solution. The metal impurities, which are eluted to the electrolytic solution, are electrodeposited on a surface of a negative electrode, break a solid electrolyte interface (SEI) film, and then form a SEI film again, thereby deteriorating the battery capacity. In addition, there is a concern that the metal impurities, which are eluted to the electrolytic solution, break through a separator and thus short-circuiting of the battery may be caused. As a method of solving the problems, for example, a manufacturing method is disclosed wherein a magnetic metal compound is removed by using a magnet so as to suppress elution of the metal impurities to the electrolytic solution (for example, refer to Patent document 7).

This method is effective to remove a magnetic metal compound such as iron and nickel. However, in this method, it is difficult to remove a non-magnetic compound such as manganese and impurities which are present in a form of a non-magnetic compound, even if the impurities are metal compounds such as iron and nickel. In addition, such a method requires a complicated manufacturing process, thereby leading to an increase in the cost, and therefore the method is not preferable.

CONVENTIONAL ART DOCUMENT

Patent Document

Patent Document 1: Japanese Laid-open Patent Publication No. 2004-014340
Patent Document 2: Japanese Laid-open Patent Publication No. 2004-014341
Patent Document 3: Japanese Laid-open Patent Publication No. 2001-015111
Patent Document 4: Japanese Laid-open Patent Publication No. 2006-032241
Patent Document 5: Japanese Laid-open Patent Publication No. 2009-048958
Patent document 6: Japanese Laid-open Patent Publication No. 2011-082133
Patent document 7: Japanese Laid-open Patent Publication No. 2009-038013

DISCLOSURE OF INVENTION

As described above, a lithium-containing metal phosphate compound, which is represented by $LiFePO_4$, has a slow diffusion rate of lithium ions, and low electron conductivity. Accordingly, input and output characteristics of the lithium-containing metal phosphate compound are inferior to that of a lithium-containing metal oxide such as $LiCoO_2$. In order to improve the input and output characteristics, it is necessary to improve lithium ion conductivity and electron conductivity by making primary particles of the positive electrode active material fine. As a method of making the primary particles of the positive electrode active material fine, a method has been typically used in which pH of raw material slurry is adjusted during preparation of the raw material slurry to control the size of the primary particles of the positive electrode active material. However, there are problems such that when pH of the raw material slurry is excessively low, battery characteristics deteriorate since crystallinity of the primary particles of the positive electrode active material deteriorates, and on the other hand, when pH of the raw material slurry is high, battery characteristics deteriorate since impurities are generated due to oxidation of a transition metal element such as iron.

With respect to the electrode material in which a plurality of the primary particles of the aforementioned positive electrode active material composed of $Li_xA_yD_zPO_4$ are aggregated to form secondary particles, carbon is interposed between the primary particles, and a surface of the electrode active material is coated with a carbonaceous film, stable and sufficient battery characteristics have not been exhibited. It is particularly necessary to suppress elution of Fe from the positive electrode to improve durability. However, such a positive electrode material elutes a large amount of Fe when carrying out cycles of a battery even now. Such a positive electrode material has poor durability, and Fe, which is eluted and originated from the positive electrode material, arrives at negative electrode carbon, and as a result, breakage of a solid electrolyte interface, blocking of intercalation and deintercalation of Li and the like are caused. Therefore, sufficient battery characteristics are not exhibited due to the effect thereof, and there is a demand for the further improved safety.

The present invention has been made in consideration of the above-described circumstances, and an purpose of the present invention is to provide a method of manufacturing a positive electrode material for a lithium ion secondary battery which is capable of realizing stable charge and discharge cycle characteristics and high stability, a positive electrode material for a lithium ion secondary battery, a positive electrode for a lithium ion secondary battery which contains the positive electrode material for a lithium ion secondary battery, and a lithium ion secondary battery that includes the positive electrode for a lithium ion secondary battery.

The present inventors have extensively studied to solve the problems, and as a result, they found that when a plurality of highly reactive raw materials are used at the time of synthesis of a positive electrode active material that contains $LiFe_xMn_{1-x-y}M_yPO_4$ particles (provided that, relationships of $0.05 \leq x \leq 1.0$ and $0 \leq y \leq 0.14$ are satisfied, and M represents at least one selected from the group consisting of Mg, Ca, Co, Sr, Ba, Ti, Zn, B, Al, Ga, In, Si, Ge and a rare-earth element) as a main component, remaining metal impurities are reduced, and thus metal impurities in the positive electrode active material can be reduced, and the positive electrode active material can be made to be very fine particles. In this way, the present inventors have accomplished the invention.

A first aspect of the invention is a method of manufacturing a positive electrode material for a lithium ion secondary battery. The method includes a first step of mixing $Li_3PO_4$, LiOH, $H_3PO_4$, an Fe source, a Mn source, and an M source (provided that, M represents at least one selected from the group consisting of Mg, Ca, Co, Sr, Ba, Ti, Zn, B, Al, Ga, In, Si, Ge and a rare-earth element) to prepare raw material slurry, with a proviso that the raw material slurry includes either or both of the Mn source and the M source, or includes neither the Mn source nor the M source, and a second step of subjecting the raw material slurry to a reaction under a high temperature and a high pressure. In the first step, mixing amounts of Li and P are set to satisfy relationships of $3.00 \leq Li/(Fe+Mn+M) \leq 3.10$ and $1.00 \leq P/(Fe+Mn+M) \leq 1.10$, respectively, mixing amounts of LiOH and $H_3PO_4$ are set to satisfy relationships of $0 < LiOH/(Fe+Mn+M) < 0.40$ and $0 < H_3PO_4/(Fe+Mn+M) < 0.15$, respectively, the amount of $Li_3PO_4$, LiOH, $H_3PO_4$, the Fe source, the Mn source, and the M source in the raw material slurry is set to 0.5 to 1.5 mol/L in terms of $LiFe_xMn_{1-x-y}M_yPO_4$ ($0.05 \leq x \leq 1.0$ and $0 \leq y \leq 0.14$), and the pH of the raw material slurry is set to 4.0 to 5.5.

A second aspect of the present invention is a positive electrode material for a lithium ion secondary battery. The positive electrode material are aggregated particles in which $LiFe_xMn_{1-x-y}M_yPO_4$ particles (provided that, relationships of $0.05 \le x \le 1.0$ and $0 \le y \le 0.14$ are satisfied, and M represents at least one selected from the group consisting of Mg, Ca, Co, Sr, Ba, Ti, Zn, B, Al, Ga, In, Si, Ge and a rare-earth element) are aggregated, and a surface of the $LiFe_xMn_{1-x-y}M_yPO_4$ particles is coated with a carbonaceous film. The positive electrode material has a specific magnetization quantity which is 0.70 emu/g or less, has a ratio I(020)/I(200) which is 2.70 to 5.00 wherein I(020) represents X-ray intensity of a (020) face wherein a diffraction angle 2θ is in the vicinity of 29° in an X-ray diffraction pattern and I(200) represents X-ray intensity of a (200) face wherein a diffraction angle 2θ is in the vicinity of 17° in an X-ray diffraction pattern, and has a specific surface area which is 7 m²/g or more.

A third aspect of the present invention is a positive electrode for a lithium ion secondary battery. The positive electrode includes a positive electrode current collector, and a positive electrode mixture layer that is formed on the positive electrode current collector. The positive electrode mixture layer contains the positive electrode material for a lithium ion secondary battery of the present invention.

A lithium ion secondary battery of the present invention is characterized in that the lithium ion secondary battery includes the positive electrode for a lithium ion secondary battery of the present invention.

Effects of the Invention

According to the method of manufacturing a positive electrode material for a lithium ion secondary battery of the present invention, a plurality of highly reactive raw materials are used, and therefore, it is possible to manufacture a positive electrode material for a lithium ion secondary battery in which remaining metal impurities are reduced, and thus metal impurities in the positive electrode active material can be reduced, and positive electrode active material can be generated as very fine particles.

According to the positive electrode material for a lithium ion secondary battery of the present invention, it is possible to enhance purity and crystallinity of the positive electrode active material which is represented by $LiFe_xMn_{1-x-y}M_yPO_4$, and it is possible to make the positive electrode active material be very fine particles. Accordingly, it is possible to obtain a positive electrode material for a lithium ion secondary battery in which specific magnetization quantity is low, and lithium ion conductivity and electron conductivity are high.

According to a positive electrode for a lithium ion secondary battery of the present invention, since the positive electrode contains the positive electrode material for a lithium ion secondary battery of the present invention, it is possible to obtain an electrode for a lithium ion secondary battery in which a discharge capacity and a mass energy density are high even at a low temperature and/or during high-speed charge and discharge.

According to the lithium ion secondary battery of the present invention, since the lithium ion secondary battery includes the positive electrode for a lithium ion secondary battery of the present invention, it is possible to obtain a lithium ion secondary battery in which the discharge capacity and the mass energy density are high even at a low-temperature and/or during high-speed charge and discharge.

BEST MODE FOR CARRYING OUT THE INVENTION

Hereinafter, suitable embodiments and examples of a method of manufacturing a positive electrode material for a lithium ion secondary battery, a positive electrode material for a lithium ion secondary battery, a positive electrode for a lithium ion secondary battery, and a lithium ion secondary battery of the present invention are explained below.

It should be noted that the present invention will not be limited to the following embodiments and examples. Any additions, omissions, substitutions and other modifications can be made without departing from the scope of the present invention.

[Method of Manufacturing Positive Electrode Material for Lithium Ion Secondary Battery]

A method of manufacturing a positive electrode material for a lithium ion secondary battery of this embodiment includes a first step of mixing $Li_3PO_4$, LiOH, $H_3PO_4$, an Fe source, a Mn source and an M source (provided that, M represents at least one selected from the group consisting of Mg, Ca, Co, Sr, Ba, Ti, Zn, B, Al, Ga, In, Si, Ge and a rare-earth element) to prepare raw material slurry, and a second step of subjecting the raw material slurry to a reaction under a high temperature and a high pressure. In the first step, mixing amounts of Li and P are set to satisfy relationships of $3.00 \le Li/(Fe+Mn+M) \le 3.10$ and $1.00 \le P/(Fe+Mn+M) \le 1.10$, respectively, mixing amounts of LiOH and $H_3PO_4$ are set to satisfy relationships of $0 < LiOH/(Fe+Mn+M) < 0.40$ and $0 < H_3PO_4/(Fe+Mn+M) < 0.15$, respectively, the amount of $Li_3PO_4$, LiOH, $H_3PO_4$, the Fe source, the Mn source, and the M source in the raw material slurry is set to 0.5 mol/L to 1.5 mol/L in terms of $LiFe_xMn_{1-x-y}M_yPO_4$ ($0.05 \le x \le 1.0$ and $0 \le y \le 0.14$), and pH of the raw material slurry A is set to 4.0 to 5.5.

Addition of one of or both of a Mn source and an M source may be omitted as necessary, in so far as the raw material slurry satisfies the aforementioned formulae.

In the present invention, a raw material slurry includes $Li_3PO_4$, LiOH, $H_3PO_4$, the Fe source, the Mn source and the M source as essentially components. It is preferable that the raw material slurry includes a solvent described below, and also preferable that the raw material slurry includes an organic compound described below. The raw material slurry can also include other materials which are described in the following embodiments. That is, the row material slurry of the present invention may include the organic compound and/or other materials optionally and/or a solvent. The organic compound and/or other materials may be added to the raw material slurry before or after the second step.

In the method of manufacturing the positive electrode material for a lithium ion secondary battery of this embodiment, $Li_3PO_4$, LiOH, $H_3PO_4$, the Fe source, the Mn source, the M source, and an organic compound are put into a solvent, and are stirred to be uniformly dispersed, thereby preparing raw material slurry of the positive electrode material for a lithium ion secondary battery.

Hereinafter, the $Li_3PO_4$, LiOH, $H_3PO_4$, the Fe source, the Mn source, and the M source may be collectively referred to as a precursor of the positive electrode active material. The precursor may means the combination of the $Li_3PO_4$, LiOH, $H_3PO_4$, the Fe source, the Mn source and the M source, or the primary particles formed using them.

With regard to powder properties of the positive electrode active material, the amount of impurities having ferromagnetism, which is different from that of an unreacted positive electrode active material component (metal element) is quantitatively evaluated by using vibration sample type magnetometer (VSM), and $Li_3PO_4$, LiOH, $H_3PO_4$, the Fe source, the Mn source and the M source are mixed in such a manner that mixing amounts of Li and P satisfy relationships of $3.00 \le Li/(Fe+Mn+M) \le 3.10$ and $1.00 \le P/(Fe+Mn+$ M)≤1.10, respectively, and mixing amounts of LiOH and $H_3PO_4$ satisfy relationships of 0<LiOH/(A+D)<0.40 and 0<$H_3PO_4$/(Fe+Mn+M)<0.15, respectively, when the raw material slurry is prepared.

Here, the reason why the mixing amounts of Li and P during preparation of the raw material slurry are set to a range satisfying the above-described relationships is that when the mixing amounts of Li and P satisfy the relationships of 3.00≤Li/(Fe+Mn+M)≤3.10 and 1.00≤P/(Fe+Mn+M)≤1.10, respectively, it is possible to reduce an unreacted metal element, and thus it is possible to improve a reaction rate of a raw material. However, in a case where only Li(Fe+Mn+M) satisfies the above-described range, the $LiFe_xMn_{1-x-y}M_yPO_4$ particles become too small. In a case where only P(Fe+Mn+M) satisfies the above-described range, the $LiFe_xMn_{1-x-y}M_yPO_4$ particles are coarsened, that is, become too large. Accordingly, it is important that the mixing amounts of Li and P satisfy 3.00≤Li/(Fe+Mn+M)≤3.10 and 1.00≤P/(Fe+Mn+M)≤1.10, respectively.

In addition, in a case where the mixing amounts of Li and P satisfy at least one of relationships of Li/(Fe+Mn+M)<3.00 and P/(Fe+Mn+M)<1.00, the mixing amounts of Li and P deviate from a stoichiometric ratio, and thus an unreacted metal element increases, and a large amount of metal impurities remains in the $LiFe_xMn_{1-x-y}M_yPO_4$ particles. In a case where a component which mainly contains metal impurities, which are different from the $LiFe_xMn_{1-x-y}M_yPO_4$ particles, is mixed in the $LiFe_xMn_{1-x-y}M_yPO_4$ particles, a metal component is eluted and arrives to a negative electrode when forming a battery, and thus battery characteristics deteriorate.

In addition, the reason why the mixing amounts of LiOH and $H_3PO_4$ are set to a range which satisfies the above-described relationships when the raw material slurry is prepared is that, when the mixing amounts of LiOH and $H_3PO_4$ satisfy the relationships of 0<LiOH/(Fe+Mn+M)<0.40 and 0<$H_3PO_4$/(Fe+Mn+M)<0.15 respectively, it is possible to reduce an unreacted metal element, and thus it is possible to improve a reaction rate of a raw material. However, in a case where only LiOH/(Fe+Mn+M) satisfies the above-described range, the $LiFe_xMn_{1-x-y}M_yPO_4$ particles become too small. In addition, in a case where only $H_3PO_4$/(Fe+Mn+M) satisfies the above-described range, the $LiFe_xMn_{1-x-y}M_yPO_4$ particles are coarsened, that is, become too large. Accordingly, it is important that the mixing amounts of LiOH and $H_3PO_4$ satisfy the relationships of 0<LiOH/(Fe+Mn+M)<0.40 and 0<$H_3PO_4$/(Fe+Mn+M)<0.15, respectively.

In addition, it is preferable that the amount of $Li_3PO_4$, LiOH, $H_3PO_4$, the Fe source, the Mn source, and the M source in the raw material slurry is set to 0.5 to 2.0 mol/L in terms of $LiFe_xMn_{1-x-y}M_yPO_4$, more preferably 0.5 to 1.5 mol/L, still more preferably 0.8 to 1.5 mol/L, and the most preferably, 1.0 to 1.5 mol/L. It is preferable that the amount of the materials is selected so that 1 litter of the raw material slurry can generate 0.5 to 2.0 mol of $LiFe_xMn_{1-x-y}M_yPO_4$ in theory.

In a case where the amount of $Li_3PO_4$, LiOH, $H_3PO_4$, the Fe source, the Mn source, and the M source in the raw material slurry is less than 0.5 mol/L, production efficiency of $LiFe_xMn_{1-x-y}M_yPO_4$ becomes poor. On the other hand, in a case where the amount of $Li_3PO_4$, LiOH, $H_3PO_4$, the Fe source, the Mn source, and the M source in the raw material slurry is greater than 1.5 mol/L, reaction of these materials becomes not uniform, and thus unreacted $Li_3PO_4$ increases.

Further, it is preferable that the pH of the raw material slurry is set to 4.0 to 5.5 in order for the size of the $LiFe_xMn_{1-x-y}M_yPO_4$ particles to enter a predetermined range, more preferably 4.0 to 5.0, and still more preferably 4.0 to 4.5.

When the pH of the raw material slurry is less than 4.0, a part of the $LiFe_xMn_{1-x-y}M_yPO_4$ particles is dissolved, and thus crystallinity of the $LiFe_xMn_{1-x-y}M_yPO_4$ particles decreases. On the other hand, when the pH of the raw material slurry is greater than 5.5, the $LiFe_xMn_{1-x-y}M_yPO_4$ particles are oxidized, and thus impurities increase.

When the raw material slurry is rapidly alkalized during preparation of the raw material slurry, iron that is contained in the raw material slurry may be oxidized. When a small amount of LiOH and $H_3PO_4$ is added to prevent oxidation of iron when the raw material slurry is prepared, the pH of the raw material slurry increases during the $LiFe_xMn_{1-x-y}M_yPO_4$ particles are generated in comparison to a case where LiOH and $H_3PO_4$ are not added. Accordingly, the number of generated crystal nuclei of the $LiFe_xMn_{1-x-y}M_yPO_4$ particles increases, and thus the size of primary particles of the $LiFe_xMn_{1-x-y}M_yPO_4$ particles decreases.

As a Li source, lithium phosphate ($Li_3PO_4$) and lithium hydroxide (LiOH) are mainly used. In addition to $Li_3PO_4$ and LiOH, at least one selected from the group shown below may be used as the Li source in addition to $Li_3PO_4$ and LiOH. Examples of such a Li source include a lithium inorganic acid salt such as lithium carbonate ($Li_2CO_3$), lithium chloride (LiCl), lithium nitrate ($LiNO_3$), dilithium hydrogen phosphate ($Li_2HPO_4$), lithium dihydrogen phosphate ($LiH_2PO_4$), a lithium organic acid salt such as lithium acetate ($LiCH_3COO$) and lithium oxalate (($COOLi)_2$) and hydrates thereof.

As a P source, orthophosphoric acid ($H_3PO_4$) is mainly used. In addition to $H_3PO_4$, at least one selected from the group shown below may be used as the P source, in addition to $H_3PO_4$. Examples of such a P source include phosphoric acid such as metaphosphoric acid ($HPO_3$), a phosphoric acid salt such as ammonium dihydrogen phosphate ($NH_4H_2PO_4$), diammonium hydrogen phosphate (($NH_4)_2HPO_4$), ammonium phosphate (($NH_4)_3PO_4$), lithium phosphate ($Li_3PO_4$), dilithium hydrogen phosphate ($Li_2HPO_4$) and lithium dihydrogen phosphate ($LiH_2PO_4$), and hydrates thereof.

As an Fe source, for example, an iron compound such as iron (II) chloride ($FeCl_2$), iron (II) sulfate ($FeSO_4$) and iron (II) acetate ($Fe(CH_3COO)_2$) or hydrates thereof, trivalent iron compound such as iron (III) nitrate ($Fe(NO_3)_3$), iron (III) chloride ($FeCl_3$) and iron (III) citrate ($FeC_6H_5O_7$), lithium phosphate, and the like are used.

As the Mn source, a Mn salt is preferable, and examples thereof include manganese (II) chloride ($MnCl_2$), manganese (II) sulfate ($MnSO_4$), manganese (II) nitrate ($Mn(NO_3)_2$) and manganese (II) acetate ($Mn(CH_3COO)_2$), and hydrates thereof, and at least one selected from the group consisting of the above-described compounds is appropriately used.

As the M source, at least one selected from the group consisting of Mg, Ca, Co, Sr, Ba, Ti, Zn, B, Al, Ga, In, Si, Ge and a rare-earth element is used.

Examples of a Mg source include magnesium (II) chloride ($MgCl_2$), magnesium (II) sulfate ($MgSO_4$), magnesium (II) nitrate ($Mg(NO_3)_2$), magnesium (II) acetate ($Mg(CH_3COO)_2$) and hydrates thereof, and at least one selected from the group consisting of the above-described compounds is appropriately used.

Examples of a Ca source include calcium (II) chloride ($CaCl_2$), calcium (II) sulfate ($CaSO_4$), calcium (II) nitrate ($Ca(NO_3)_2$), calcium (II) acetate ($Ca(CH_3COO)_2$) and hydrates thereof, and at least one selected from the group consisting of the above-described compounds is appropriately used.

Examples of a Sr source include strontium carbonate ($SrCO_3$), strontium sulfate ($SrSO_4$) and strontium hydroxide ($Sr(OH)_2$), and at least one selected from the group consisting of the above-described compounds is appropriately used.

Example of Ba source include barium (II) chloride ($BaCl_2$), barium (II) sulfate ($BaSO_4$), barium (II) nitrate ($Ba(NO_3)_2$), barium (II) acetate ($Ba(CH_3COO)_2$) and hydrates thereof, and at least one selected from the group consisting of the above-described compounds is appropriately used.

Examples of a Ti source include titanium chloride ($TiCl_4$, $TiCl_3$, $TiCl_2$), titanium oxide (TiO) and hydrates thereof, and at least one selected from the group consisting of the above-described compounds is appropriately used.

Examples of a B source include a boron compound such as a chloride, a sulfate, a nitrate, an acetate, a hydroxide and an oxide thereof, and at least one selected from the group consisting of the above-described compounds is appropriately used.

Examples of the Al source include an aluminum compound such as a chloride, a sulfate, a nitrate, an acetate and hydroxide thereof, and at least one selected from the group consisting of the above-described compounds is appropriately used.

Examples of a Ga source include a gallium compound such as a chloride, a sulfate, a nitrate, an acetate and a hydroxide thereof, and at least one selected from the group consisting of the above-described compounds is appropriately used.

Examples of an In source include an indium compound such as a chloride, a sulfate, a nitrate, an acetate and a hydroxide thereof, and at least one selected from the group consisting of the above-described compounds is appropriately used.

Examples of a Si source include sodium silicate, potassium silicate, silicon tetrachloride ($SiCl_4$), a silicate, an organic silicon compound and the like thereof, and at least one selected from the group consisting of the above-described compounds is appropriately used.

Examples of a Ge source include a germanium compound such as a chloride, a sulfate, a nitrate, an acetate, a hydroxide and an oxide thereof, and at least one selected from the group consisting of the above-described compounds is appropriately used.

Examples of the rare-earth element include a chloride, a sulfate, a nitrate, an acetate, a hydroxide, an oxide, and the like of Sc, Y, La, Ce, Pr, Nd, Pm, Sm, Eu, Gd, Tb, Dy, Ho, Er, Tm, Yb, and Lu, and at least one selected from the group consisting of the above-described compounds is appropriately used.

As a Co source, a Co salt is preferable, and examples thereof include cobalt (II) chloride ($CoCl_2$), cobalt (II) sulfate ($CoSO_4$), cobalt (II) nitrate ($Co(NO_3)_2$), cobalt (II) acetate ($Co(CH_3COO)_2$) and hydrates thereof, and at least one selected from the group consisting of the above-described compounds is appropriately used.

As a Zn source, a Zn salt is preferable, and examples thereof include zinc (II) chloride ($ZnCl_2$), zinc (II) sulfate ($ZnSO_4$), zinc (II) nitrate ($Zn(NO_3)_2$), zinc (II) acetate ($Zn(CH_3COO)_2$) and hydrates thereof, and at least one selected from the group consisting of the above-described compounds is appropriately used.

In the present invention, the raw material slurry can include an organic compound. The organic compound may be added in the first step, or after the second step.

Examples of the organic compound include polyvinyl alcohol, polyvinyl pyrrolidone, cellulose, starch, gelatin, carboxymethyl cellulose, methyl cellulose, hydroxymethyl cellulose, hydroxyethyl cellulose, polyacrylic acid, polystyrene sulfonic acid, polyacryl amide, polyvinyl acetate, glucose, fructose, galactose, mannose, maltose, sucrose, lactose, glycogen, pectin, alginic acid, glucomannan, chitin, hyaluronic acid, chondroitin, agarose, polyether, polyhydric alcohol; and the like.

Examples of the polyhydric alcohol include polyethylene glycol, polypropylene glycol, polyglycerin, glycerin; and the like.

With regard to mixing ratios of the precursor of the electrode active material and the organic compound, it is preferable that, when the total mass of the organic compound is converted to the amount of carbon, the mixing ratio of the organic compound (the amount of carbon) is 0.6 to 10 parts by mass on the basis of 100 parts by mass of the precursor of the electrode active material, more preferably 0.7 to 7 parts by mass, and still more preferably 0.8 to 4.0 parts by mass.

When the mixing ratio of the organic compound which is converted to the amount of carbon is less than 0.6 parts by mass, a coverage ratio of a carbonaceous film, which is generated on a surface of the electrode active material by subjecting the organic compound to a heat treatment, may become less than 80%. Therefore, when a battery is formed using such a material, a discharge capacity may become low at a high-speed charge and discharge rate, and thus it may be difficult to realize sufficient charge and discharge rate performance. On the other hand, when the mixing ratio of the organic compound which is converted to the amount of carbon is greater than 10 parts by mass, the mixing ratio of the electrode active material may relatively decrease. Therefore, the capacity of the battery may decrease when a battery is formed using such a material, and a volume density of the electrode active material may increase as the carbonaceous film is excessively carried on the electrode active material. As a result, an electrode density may decrease, and thus a decrease in the battery capacity of the lithium ion secondary battery per unit volume may become non-negligible.

The raw material slurry can include a solvent. It is preferable that the solvent is mixed in the first step.

As a solvent that dissolves or disperses the precursor of the electrode active material and/or the organic compound which is preferably included in the slurry, water is preferable. Examples of the solvent include, in addition to water, alcohols such as methanol, ethanol, 1-propanol, 2-propanol (isopropyl alcohol: IPA), butanol, pentanol, hexanol, octanol and diacetone alcohol, esters such as ethyl acetate, butyl acetate, ethyl lactate, propylene glycol monomethyl ether acetate, propylene glycol monoethyl ether acetate and γ-butyrolactone, ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether and diethylene glycol monoethyl ether, ketones such as acetone, methyl ethyl ketone (MEK), methyl isobutyl ketone (MIBK), acetyl acetone and cyclohexanone, amides such as dimethyl formamide, N,N-dimethylacetoacetamide and N-methylpyrrolidone, glycols such as ethylene glycol, diethylene glycol and propylene glycol, and the like. These solvents may be used alone or in combination of two or more kinds.

The amount of the solvent included in the raw material slurry can be selected as required. For example, it is preferable that the amount of the solvent is 40 to 90% by mass when the total amount of the raw material slurry is 100% by mass, more preferably 50 to 80% by mass, and still more preferably 50 to 70% by mass.

A dispersing agent may be added as necessary during adjustment of the raw material slurry.

A method of dispersing the precursor of the electrode active material or the combination of the precursor and the organic compound in the solvent is not particularly limited as long as the precursor of the electrode active material is uniformly dispersed and/or the organic compound is dissolved and/or dispersed by the method. As the dispersion method, for example, a method is preferably used which uses a medium stirring type dispersion apparatus such as a planetary ball mill, a vibration ball mill, a bead mill, a paint shaker and an attritor, wherein medium particles are stirred at a high speed.

When dissolving or dispersing the precursor of the electrode active material and the organic compound, it is preferable to carry out stirring in such a manner that the precursor of the electrode active material is dispersed as primary particles in a solvent, and then the organic compound is dissolved in the solvent. In this case, the surface of the primary particles which is the precursor of the electrode active material is coated with the organic compound, and as a result, a carbonaceous film originated from the organic compound is uniformly interposed between the primary particles of the electrode active material.

When a reaction is performed for the raw material slurry under a high temperature and a high pressure in the second step, the conditions of the high temperature and the high pressure can be selected as necessary. For example, it is preferable that the high temperature is in a range of 120 to 250° C., more preferably 150 to 250° C., and still more preferably in a range of 150 to 220° C. It is preferable that the high pressure is in a range of 0.2 to 2.5 MPa, more preferably in a range of 0.3 to 2.3 MPa, and still more preferably in a range of 0.3 to 2 MPa.

In the present invention, it is preferable that the synthesis which is performed in the second step is hydrothermal synthesis. In the present invention, it is preferable to set conditions of temperature and pressure to perform the hydrothermal synthesis.

Then, the raw material slurry is sprayed in a high-temperature atmosphere, for example, in air of 70° C. to 250° C. by using a spray pyrolysis method, and then the raw material slurry that is sprayed is dried to produce a granule. Temperature can be preferably selected in the above range, and for example, the scope of 70 to 210° C., the scope of 100 to 230° C., the scope of 130 to 200° C. or the like can be selected in accordance with conditions.

In the spray pyrolysis method, it is preferable that a particle diameter of a liquid droplet during spraying is 0.05 μm to 500 μm so as to produce an approximately spherical granule through quick drying.

Then, the granule is subjected to heat treatment under an inert atmosphere or a reducing atmosphere to obtain aggregated particles having a carbonaceous film. A heat treatment temperature is preferably selected, and is preferably 700° C. to 1000° C., more preferably 750° C. to 950° C., and still more preferably 800° C. to 900° C.

As the inert atmosphere, an atmosphere which consists of an inert gas such as nitrogen ($N_2$) and argon (Ar) is preferable. In a case of further suppressing oxidation of the granule, a reducing atmosphere which contains a reducing gas such as hydrogen ($H_2$) is preferably used.

Here, the reason why the heat treatment temperature is preferably set to 700° C. to 1000° C. is as follows. When the heat treatment temperature is lower than 700° C., a decomposition and reaction of the organic compound may progress insufficiently. As a result, carbonization of the organic compound may be performed insufficiently, and thus a high-resistance organic decomposed material which is a generated decomposed and reacted material may be generated, and thus such a range is not preferable. On the other hand, when the heat treatment temperature is higher than 1000° C., a component which constitutes the electrode active material, for example, lithium (Li) may evaporate and thus compositional deviation may occur. In addition, granule growth of the electrode active material may be too promoted, and thus when a battery is formed, the discharge capacity may decrease in a high-speed charge and discharge rate. Accordingly, it may be difficult to realize sufficient charge and discharge rate performance.

The heat treatment time is not particularly limited as long as the organic compound is sufficiently carbonized in the heat treatment time, and for example, the heat treatment time is set to 0.1 hours to 10 hours.

In a case where the precursor of the electrode active material is included in the granule, the precursor of the electrode active material becomes the electrode active material. On the other hand, decomposition and reaction of the organic compound are performed during the heat treatment to generate carbon, and the carbon adheres to the surface of the electrode active material to form a carbonaceous film. According to this, the surface of the electrode active material is covered with the carbonaceous film.

Here, in a case where the electrode active material includes lithium as a constituent component, as the heat treatment time is lengthened, lithium is diffused from the electrode active material to the carbonaceous film, and thus lithium exists in the carbonaceous film, and conductivity of the carbonaceous film is further improved. Accordingly, this case is preferable.

However, when the heat treatment time is excessively lengthened, abnormal grain growth may occur, or an electrode active material, in which lithium is partially deficient, may be generated. Therefore, the performance of the electrode active material may decrease. As a result, such an electrode active material may cause a decrease in characteristics of a battery.

[Positive Electrode Material for Lithium Ion Secondary Battery]

The positive electrode material for a lithium ion secondary battery of the present invention is a positive electrode material wherein the positive electrode material includes aggregate in which $LiFe_xMn_{1-x-y}M_yPO_4$ (provided that, relationships of $0.05 \leq x \leq 1.0$ and $0 \leq y \leq 0.14$ are satisfied, and M represents at least one selected from the group consisting of Mg, Ca, Co, Sr, Ba, Ti, Zn, B, Al, Ga, In, Si, Ge and a rare-earth element) particles are aggregated, and a surface of the $LiFe_xMn_{1-x-y}M_yPO_4$ particles is coated with a carbonaceous film. The positive electrode material has a specific magnetization quantity which is 0.70 emu/g or less, has a specific surface area which is 7 $m^2$/g or more, and has a ratio I(020)/I(200) which is 2.70 to 5.00, wherein I(020) represents X-ray intensity of a (020) face in which a diffraction angle $2\theta$ is in the vicinity of 29°, and I(200) represents X-ray intensity of a (200) face in which a diffraction angle $2\theta$ is in the vicinity of 17° in an X-ray diffraction pattern.

The positive electrode material for a lithium ion secondary battery of this embodiment are aggregated particles (secondary particles) in which primary particles of a positive electrode active material composed of $LiFe_xMn_{1-x-y}M_yPO_4$ are aggregated, and the surface of the primary particles are coated with the carbonaceous film.

An average primary particle diameter of the primary particles of the positive electrode active material composed of $LiFe_xMn_{1-x-y}M_yPO_4$ is preferably 0.01 to 20 µm, more preferably 0.01 to 13 µm, still more preferably 0.02 to 9 µm, and most preferably 0.02 to 5 µm.

Here, the reason why the average primary particle diameter of the primary particles of the positive electrode active material composed of $LiFe_xMn_{1-x-y}M_yPO_4$ is set to the above described range is as follows. When the average primary particle diameter of the primary particles of the positive electrode active material composed of $LiFe_xMn_{1-x-y}M_yPO_4$ is less than 0.01 µm, it may be difficult to sufficiently cover the surface of the primary particles of the positive electrode active material with the carbonaceous film. When a lithium ion secondary battery uses such a positive electrode material for a lithium ion secondary battery, the discharge capacity may decrease at a high-speed charge and discharge, and thus it may be difficult to realize sufficient charge and discharge performance. On the other hand, when the average primary particle diameter of the primary particles of the positive electrode active material composed of $LiFe_xMn_{1-x-y}M_yPO_4$ is greater than 20 µm, internal resistance of the primary particles of the positive electrode active material composed of $LiFe_xMn_{1-x-y}M_yPO_4$ may increase. Accordingly, when a lithium ion secondary battery uses such a positive electrode material for a lithium ion secondary battery, the discharge capacity during high-speed charging and discharging may become insufficient.

The average particle diameter in this embodiment represents a number average particle diameter. The average primary particle diameter of the primary particles of the positive electrode active material composed of $LiFe_xMn_{1-x-y}M_yPO_4$ can be measured by using a laser diffraction/scattering particle size distribution analyzer, and the like.

The shape of the primary particles of the positive electrode active material composed of $LiFe_xMn_{1-x-y}M_yPO_4$ is not particularly limited. It is preferable that the primary particles have a spherical shape, particularly, a perfectly spherical shape, from the view point that it is easy to produce secondary particles having the spherical shape, particularly, the perfectly spherical shape as a positive electrode material.

The reason why such a spherical shape is preferable as the shape of the primary particles of the positive electrode active material is that when the positive electrode material for a lithium ion secondary battery, a binder resin (binder) and a solvent are mixed to prepare a positive electrode material paste for a lithium ion secondary battery, it is possible to reduce the amount of the solvent, and the positive electrode material paste can be easily coated on a current collector. In addition, when the primary particles of the positive electrode active material have the spherical shape, the surface area of the primary particles of the positive electrode active material becomes the minimum and thus it is possible to minimize a mixing amount of the binder resin (binder) that is added to the positive electrode material paste for a lithium ion secondary battery, and then it is possible to decrease the internal resistance of the positive electrode that is obtained. Furthermore, when the primary particles of the positive electrode active material have the spherical shape, closest packed structure is easily formed. Accordingly, a filling amount of the positive electrode material for a lithium ion secondary battery per unit volume increases. As a result, it is possible to increase an electrode density, and thus it is possible to obtain a high-capacity lithium ion secondary battery.

The thickness of the carbonaceous film is preferably 0.1 to 20 nm.

The reason why the thickness of the carbonaceous film is set to the above-described range is as follows. When the thickness is less than 0.1 nm, the thickness of the carbonaceous film may become too thin, and thus it may be difficult to form a film having a desired resistance. As a result, conductivity may decrease, and thus it may be difficult to secure the conductivity necessary for the positive electrode material. On the other hand, when the thickness of the carbonaceous film is greater than 20 nm, battery activity, for example, a battery capacity per unit mass of the positive electrode material may decrease.

In addition, the reason why the thickness of the carbonaceous film is set to the above-described range is as follows. Closest packed structure of the positive electrode material is easily formed, and thus a filling amount of the positive electrode material for a lithium ion secondary battery per unit volume increases. As a result, it is possible to increase the electrode density, and thus it is possible to obtain a high-capacity lithium ion secondary battery.

With respect to the positive electrode material for a lithium ion secondary battery which includes the agglomerated particles in which the primary particles of the positive electrode active material composed of $LiFe_xMn_{1-x-y}M_yPO_4$ are aggregated and the surface of the primary particles is covered with the carbonaceous film, the average particle diameter of the positive electrode material is preferably 0.5 to 100 µm, more preferably 0.7 to 75 µm, and still more preferably 1.0 to 50 µm.

Here, the reason why the average particle diameter of the positive electrode material for a lithium ion secondary battery is set to the above-described range is as follows. When the average particle diameter of the positive electrode material for a lithium ion secondary battery is less than 0.5 µm, a specific surface area of carbonaceous electrode active material composite particles (the positive electrode material for a lithium ion secondary battery) may increase, and thus the mass of carbon which is required for covering the particles may increase. As a result, when a lithium ion secondary battery uses such a positive electrode material for a lithium ion secondary battery, the charge and discharge capacity may be reduced. On the other hand, when the average particle diameter of the positive electrode material for a lithium ion secondary battery is greater than 100 µm, it may take time when lithium ions move and/or electrons migrate in the carbonaceous electrode active material composite particles (the positive electrode material for a lithium ion secondary battery), and thus the internal resistance may increase. Therefore, output characteristics deteriorate, and thus such a size is not preferable.

The amount of carbon that is contained in the positive electrode material for a lithium ion secondary battery of this embodiment is preferably 0.5 to 5.0% by mass, more preferably 0.6 to 4.8% by mass, and still more preferably 0.7 to 4.5% by mass.

Here, the reason why the amount of carbon that is contained in the positive electrode material for a lithium ion secondary battery of this embodiment is set to the above-described range is as follows. When the amount of carbon is less than 0.5% by mass, the discharge capacity of a formed battery may decrease at a high-speed charge and discharge rate, and thus it may be difficult to realize sufficient charge and discharge rate performance. On the other hand, when the amount of carbon that is contained in the positive electrode material for a lithium ion secondary battery is greater than 5.0% by mass, the amount of carbon may be too large, and thus the battery capacity of the lithium ion secondary battery per unit mass of the positive electrode material for a lithium ion secondary battery may decrease more than necessary.

In addition, it is preferable that a ratio of the amount of carried carbon to the specific surface area of the primary particles of the positive electrode active material ((amount of carried carbon)/(specific surface area of the primary particles of the positive electrode active material)) is preferably 0.03 to 0.8, and more preferably 0.04 to 0.6.

Here, the reason why the ratio of the amount of carried carbon to the specific surface area of the primary particles of the positive electrode active material is set to the above-described range is as follows. In a case where the ratio of the amount of carried carbon is less than 0.03, the discharge capacity of a formed battery may decrease at a high-speed charge and discharge rate, and thus it may be difficult to realize sufficient charge and discharge rate performance. On the other hand, when the ratio of the amount of carried carbon to the specific surface area of the primary particles of the positive electrode active material is greater than 0.8, the amount of carbon may excessively increases, and thus the battery capacity of the lithium ion secondary battery per unit mass of the primary particles of the positive electrode active material may decrease more than necessary.

In the positive electrode material for a lithium ion secondary battery of this embodiment, a specific magnetization quantity is 0.70 emu/g or less, preferably 0.60 emu/g or less, more preferably 0.50 emu/g or less, and still more preferably 0.40 emu/g or less.

When the specific magnetization quantity of the positive electrode material for a lithium ion secondary battery is 0.70 emu/g or less, the amount of Fe impurities in the positive electrode material for a lithium ion secondary battery decreases. Accordingly, when a lithium ion secondary battery uses such a positive electrode material for a lithium ion secondary battery, a discharge capacity retention rate obtained after 300 cycles can be retained to 60% or more. On the other hand, when the specific magnetization quantity of the positive electrode material for a lithium ion secondary battery is greater than 0.70 emu/g, the amount of Fe impurities in the positive electrode material for a lithium ion secondary battery may increase. Accordingly, when a lithium ion secondary battery uses such a positive electrode material for a lithium ion secondary battery, the discharge capacity retention rate obtained after 300 cycles may become less than 60%.

In this embodiment, the specific magnetization quantity of the positive electrode material for a lithium ion secondary battery is obtained such that a vibration sample type magnetometer (VSM, trade name: VSM-OP01, manufactured by Hayama Corporation) is prepared to be used, and 0.55 g of sample is provided in a holder used for measurement. A magnetization quantity per 1 g at an applied magnetic field of 5 kOe is defined as the specific magnetization quantity. A measurement temperature is set to room temperature, and an excitation frequency is set to 80 Hz.

In the positive electrode material for a lithium ion secondary battery of this embodiment, a ratio represented by I(020)/I(200), that is, an X-ray diffraction measurement peak ratio (020)/(200), is 2.70 to 5.00, preferably 2.8 to 4.6, and more preferably 3.0 to 4.3, wherein I(020) represents X-ray intensity of a (020) face in which a diffraction angle 2θ is in the vicinity of 29° in an X-ray diffraction pattern and I(200) represents X-ray intensity of a (200) face in which a diffraction angle 2θ is in the vicinity of 17°.

When the X-ray diffraction measurement peak ratio (020)/(200) is less than 2.70, crystallinity of the positive electrode material for a lithium ion secondary battery in a b-axis direction may decrease, and thus durability of the lithium ion secondary battery which uses such a positive electrode material for a lithium ion secondary battery may decrease. On the other hand, when the X-ray diffraction measurement peak ratio (020)/(200) is greater than 5.00, in the positive electrode material for a lithium ion secondary battery, a lithium diffusion distance may become large, and thus it may be difficult to secure conductivity.

In the positive electrode material for a lithium ion secondary battery of this embodiment, a specific surface area is preferably 7 m$^2$/g or more, and more preferably 9 m$^2$/g or more.

When the specific surface area is less than 7 m$^2$/g, particles of the positive electrode material for a lithium ion secondary battery may become too large, and thus a lithium diffusion velocity in the particles may become slow. Accordingly, battery characteristics of a lithium ion secondary battery which uses such a positive electrode material for a lithium ion secondary battery may deteriorate.

[Positive Electrode for Lithium Ion Secondary Battery]

The positive electrode for a lithium ion secondary battery of the present invention includes a positive electrode current collector, and a positive electrode mixture layer (electrode) that is formed on the positive electrode current collector. The positive electrode mixture layer contains the positive electrode material for a lithium ion secondary battery of the present invention.

It is preferable that, in the positive electrode for a lithium ion secondary battery of the embodiment, the positive electrode mixture layer is formed on one main surface of the positive electrode current collector by using the positive electrode material for a lithium ion secondary battery of the embodiment.

A method of manufacturing the positive electrode for a lithium ion secondary battery of the present invention is not particularly limited as long as the method is capable of forming an electrode on one main surface of the positive electrode current collector by using the positive electrode material for a lithium ion secondary battery of the present invention. As the method of manufacturing the positive electrode for a lithium ion secondary battery, for example, the following method can be exemplified.

First, positive electrode material paste for a lithium ion secondary battery, which is obtained by mixing the positive electrode material for a lithium ion secondary battery, a binder and a solvent, is prepared.

In addition, a conductive assistant may be added to the positive electrode material for a lithium ion secondary battery of the present invention as necessary.

[Binder]

As the binder, that is, a binder resin, for example, a polytetrafluoroethylene (PTFE) resin, a polyvinylidene fluoride (PVdF) resin, a fluororubber and the like are preferably used.

A mixing ratio between the positive electrode material for a lithium ion secondary battery of the present invention and the binder is not particularly limited. For example, the binder is preferably 1 to 30 parts by mass on the basis of 100 parts by mass of the positive electrode material for a lithium ion secondary battery of the present invention, and more preferably 3 to 20 parts by mass.

Here, the reason why the mixing ratio between the positive electrode material for a lithium ion secondary battery of the present invention and the binder is set to the above-described range is as follows. When a positive electrode mixture layer is formed using a positive electrode material paste for a lithium ion secondary battery which includes the positive electrode material for a lithium ion secondary battery such that the mixing ratio of the binder is less than 1 part by mass, binding properties between the positive electrode mixture layer and a positive electrode current collector may become insufficient. Therefore, cracking and/or detachment of the positive electrode mixture layer may occur during rolling of the positive electrode mixture layer and the like, and thus the above-described mixing ratio of a binder which is less than 1 part by mass is not preferable. In addition, it is not preferable since the positive electrode mixture layer may be peeled off from the positive electrode current collector during battery charging and discharging, and a battery capacity or a charge and discharge rate may decrease. On the other hand, when the mixing ratio of the binder is greater than 30 parts by mass, the internal resistance of the positive electrode material for a lithium ion secondary battery increases, and the battery capacity may decrease at a high-speed charge and discharge rate, and thus such a mixing ratio is not preferable.

[Conductive Assistant]

Although not particularly limited, as the conductive assistant, for example, at least one selected from fibrous carbon groups such as acetylene black, Ketjen black, furnace black, vapor growth carbon fiber (VGCF) and a carbon nanotube is used.

[Solvent]

In the positive electrode material paste for a lithium ion secondary battery which includes the positive electrode material for a lithium ion secondary battery of the present invention, a solvent is appropriately added for ease of application with respect to an object to be coated such as a current collector.

Examples of the solvent include water, alcohols such as methanol, ethanol, 1-propanol, 2-propanol (isopropyl alcohol: IPA), butanol, pentanol, hexanol, octanol and diacetone alcohol, esters such as ethyl acetate, butyl acetate, ethyl lactate, propylene glycol monomethyl ether acetate, propylene glycol monoethyl ether acetate and γ-butyrolactone, ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether and diethylene glycol monoethyl ether, ketones such as acetone, methyl ethyl ketone (MEK), methyl isobutyl ketone (MIBK), acetyl acetone and cyclohexanone, amides such as dimethyl formamide, N, N-dimethylacetoacetamide and N-methylpyrrolidone, glycols such as ethylene glycol, diethylene glycol and propylene glycol, and the like. These solvents may be used alone or in combination of two or more kinds.

When the total mass of the positive electrode material for a lithium ion secondary battery of the present invention, the binder and the solvent is set to 100% by mass, the content rate of the solvent in the positive electrode material paste for a lithium ion secondary battery is preferably 50 to 70% by mass, and more preferably 55 by mass to 65% by mass.

When the solvent is contained in the above-described range, it is possible to obtain the positive electrode material paste for a lithium ion secondary battery which can achieve excellent positive electrode forming properties, and excellent battery characteristics.

A method of mixing the positive electrode material for a lithium ion secondary battery of the present invention, the binder, the conductive assistant and the solvent is not particularly limited as long as the method is capable of uniformly mixing these components, and examples thereof include a method using a kneader or a mixer such as a ball mill, a sand mill, a planetary mixer, a paint shaker and a homogenizer.

Then, the positive electrode material paste for a lithium ion secondary battery is applied onto one main surface of the positive electrode current collector to form a film, and the film is dried. Subsequently, the film is compressed under pressure, thereby obtaining a positive electrode for a lithium ion secondary battery in which the positive electrode mixture layer is formed on the one main surface of the positive electrode current collector.

[Lithium Ion Secondary Battery]

The lithium ion secondary battery of the present invention includes the positive electrode for a lithium ion secondary battery of the present invention, a negative electrode, a separator and an electrolytic solution.

[Negative Electrode]

When preparing the negative electrode, a graphite powder, a binder composed of a binder resin and a solvent are mixed to prepare a coating material for the negative electrode or paste for the negative electrode.

In addition, a conductive assistant such as carbon black may be added to the coating material for the negative electrode or the paste for the negative electrode as necessary.

As the binder, that is, the binder resin, for example, a polytetrafluoroethylene (PTFE) resin, a polyvinylidene fluoride (PVdF) resin, a fluororubber and the like are appropriately used.

A mixing ratio between the graphite powder and the binder is not particularly limited, and for example, the binder is preferably 1 to 30 parts by mass on the basis of 100 parts by mass of the graphite powder, and more preferably 3 to 20 parts by mass.

[Electrolytic Solution]

For example, the electrolytic solution can be prepared by mixing ethylene carbonate (EC) and ethyl methyl carbonate (EMC) in a volume ratio of 1:1, and dissolving lithium hexafluorophosphate ($LiPF_6$) to the obtained resultant mixed solvent, for example, in a concentration of 1 $mol/dm^3$.

[Separator]

As the separator, for example, porous propylene can be used.

A solid electrolyte may be used instead of the electrolytic solution and the separator.

In the lithium ion secondary battery of the present invention, the lithium ion secondary battery has a high capacity and a high energy density since the positive electrode for a lithium ion secondary battery of the present invention is used.

As described above, in the method of manufacturing the positive electrode material for a lithium ion secondary battery of the present invention, a plurality of highly reactive raw materials are used, and therefore, it is possible to manufacture a positive electrode material for a lithium ion secondary battery in which remaining metal impurities are reduced, metal impurities in the positive electrode active material are reduced, and the positive electrode active material is formed as very fine particles. In addition, the obtained positive electrode material for a lithium ion secondary battery can have low specific magnetization quantity, and high lithium ion conductivity and high electron conductivity.

According to the positive electrode material for a lithium ion secondary battery of the present invention, it is possible to enhance purity and crystallinity of the positive electrode active material composed of $LiFe_xMn_{1-x-y}M_yPO_4$, and it is possible to generate very fine particles of the positive electrode active material. Accordingly, it is possible to obtain a positive electrode material for a lithium ion secondary battery which has a low specific magnetization quantity, high lithium ion conductivity and high electron conductivity.

According to the positive electrode for a lithium ion secondary battery of the present invention, since the positive electrode contains the positive electrode material for a lithium ion secondary battery of the present invention, it is possible to provide a positive electrode for a lithium ion secondary battery in which a discharge capacity and a mass energy density are high at a low temperature or during high-speed charge and discharge.

According to the lithium ion secondary battery of the present invention, since the lithium ion secondary battery includes the positive electrode for a lithium ion secondary battery of the present invention, it is possible to provide a lithium ion secondary battery in which the discharge capacity and the mass energy density are high even at a low-temperature or during high-speed charging and discharging.

EXAMPLES

Hereinafter, the present invention will be explained in more detail with reference to Examples and Comparative Examples, but the present invention is not limited to the following Examples.

Example 1

Synthesis of Positive Electrode Material for Lithium Ion Secondary Battery

Lithium phosphate ($Li_3PO_4$), lithium hydroxide (LiOH), 2 moles of iron (II) sulfate ($FeSO_4$), and phosphoric acid ($H_3PO_4$) were mixed with 2 L of water in such a manner that in terms of a molar ratio, Li/Fe became 3.01, $Li_3PO_4$/Fe became 0.95, LiOH/Fe became 0.13, and $H_3PO_4$/Fe became 0.04, and the total amount became 4 L, thereby preparing a mixture in a uniform slurry state.

Subsequently, the mixture was put into a pressure-resistant sealed vessel with a capacity of 8 L, and was subjected to hydrothermal synthesis at 120° C. for one hour, thereby obtaining a precipitate. PH of the obtained precipitate was 4.98.

The precipitate was washed with water, thereby obtaining a cake-like precursor of the electrode active material.

Subsequently, 5.5 g of polyethylene glycol as an organic compound, and 500 g of zirconia balls having a diameter of 5 mm as medium particles were mixed with 150 g (in terms of solid content) of the precursor of the electrode active material, and the resultant mixture was subjected to a dispersion treatment with a ball mill for 12 hours, thereby preparing uniform slurry.

Subsequently, the slurry was sprayed and dried in the atmospheric atmosphere at 180° C., thereby obtaining a granule composed of $LiFePO_4$ which was coated with an organic material and had an average particle diameter of 6 µm.

The granule that was obtained was baked under a non-oxidizing gas atmosphere at 700° C. for one hour, and was retained at 40° C. for 30 minutes, thereby obtaining a positive electrode material (A1).

The positive electrode material (A1) was observed with a scanning electron microscope (SEM) and a transmission electron microscope (TEM). From the observation, it could be seen that a plurality of primary particles were aggregated to form secondary particles, and the surface of the primary particles was covered with thin film-shaped carbon, and carbon was interposed between the primary particles.

[Preparation of Lithium Ion Secondary Battery]

The positive electrode material (A1), polyvinylidene fluoride (PVdF) as the binder, and acetylene black (AB) as the conductive assistant were added to N-methyl-2-pyrrolidone (NMP) as the solvent in a ratio of positive electrode material (A1):AB:PVdF=90:5:5 in terms of a mass ratio in the paste, and these materials were mixed to prepare the positive electrode material paste.

Subsequently, the positive electrode material paste was applied onto a surface of aluminum foil (current collector) having a thickness of 30 µm to form a film, and the film was dried, thereby forming the positive electrode mixture layer on a surface of the aluminum foil. Then, the positive electrode mixture layer was compressed under a predetermined pressure to obtain a predetermined density, thereby preparing a positive electrode of Example 1.

Subsequently, the positive electrode was punched into a circular disk having a diameter of 16 mm by using a forming machine, and the circular disk that was punched was vacuum-dried, and then, a lithium ion secondary battery of Example 1 was prepared by using stainless steel (SUS) 2016 coin-type cell under a dry-argon atmosphere.

Metal lithium or carbon was used as the negative electrode, a porous polypropylene membrane was used as the separator, and 1M $LiPF_6$ solution was used as the electrolytic solution. As the $LiPF_6$ solution, a solution, which was obtained by mixing ethylene carbonate and ethyl methyl carbonate in a volume ratio of 1:1, was used.

[Evaluation of Positive Electrode Material]

(1) Specific Magnetization Quantity

With regard to calculation of the specific magnetization quantity of the positive electrode material, a vibration sample type magnetometer (VSM, trade name: VSM-OP01, manufactured by Hayama Corporation) was used. 0.55 g of sample was packed in a holder used for measurement, and calculation was performed such that a magnetization quantity per 1 g at an applied magnetic field of 5 kOe was defined as the specific magnetization quantity. A measurement temperature was set to room temperature, and an excitation frequency was set to 80 Hz.

The result is illustrated in Table 1.

(2) X-Ray Diffraction

With respect to the positive electrode material, a ratio I(020)/I(200) which is a ratio of X-ray intensity I(020) of a (020) face in which a diffraction angle 2θ is in the vicinity of 29° in an X-ray diffraction pattern to X-ray intensity I(200) of a (200) face in which a diffraction angle 2θ is in the vicinity of 17° in an X-ray diffraction pattern was calculated using an X-ray diffraction apparatus (trade name: X'Pert PRO MPD, manufactured by PANalytical B.V., detector: X'celarator, radiation source: CuKa).

The Result is illustrated in Table 1.

(3) Specific Surface Area

The specific surface area of the positive electrode material was measured in accordance with a BET method based on nitrogen ($N_2$) absorption by using a specific surface area meter (trade name: BELSORP-mini, manufactured by MicrotracBEL Corp.).

The result is illustrated in Table 1.

(4) Amount of Carbon

The amount of carbon in the positive electrode material was measured by using a carbon analyzer (trade name: EMIA-220 V, manufactured by HORIBA, Ltd.).

The result is illustrated in Table 1.

[Evaluation of Lithium Ion Secondary Battery]

(1) Battery Characteristics

Constant current charging was carried out with respect to a battery in which metal lithium was set as the negative electrode at an environmental temperature of 25° C. with a current value of 1 C until a charged voltage reached 4.2 V. Then discharge was carried out with a discharge current of 1 C, and discharge was terminated when a battery voltage reached 2.5 V. A discharge capacity at that time was measured, and the measured discharge capacity was set as an initial capacity. In addition, constant current charge was carried out at an environmental temperature of 25° C. with a current value of 1 C until a charged voltage reached 4.2 V, and a discharge capacity at a discharge current of 3 C was also measured.

In addition, with respect to a battery in which carbon was set as the negative electrode, constant current charge was carried out at an environmental temperature of 60° C. with a current value of 1 C until a charged voltage reached 4.2 V. Then, the constant current charge was switched to constant voltage charge, and charge was terminated when a current value reached 0.01 C. Then, discharge with a discharge current of 1 C was carried out, and discharge was terminated when a battery voltage reached 2.5 V. A discharge capacity at that time was measured and was set as an initial capacity. Then, charging and discharging were repeated under the above-described conditions to measure a discharge capacity at a $300^{th}$ cycle, and then a capacity retention rate with respect to the initial capacity was calculated.

Results of the above-described steps are illustrated in Table 1.

Example 2

Lithium phosphate ($Li_3PO_4$), lithium hydroxide (LiOH), 2 moles of iron (II) sulfate ($FeSO_4$) and phosphoric acid ($H_3PO_4$) were mixed with 2 L of water in such a manner that in terms of a molar ratio, Li/Fe became 3.01, $Li_3PO_4$/Fe became 0.95, LiOH/Fe became 0.20, and $H_3PO_4$/Fe became 0.06, and the total amount became 4 L, thereby preparing a mixture in a uniform slurry state.

Subsequently, a precipitate was obtained in the same manner as in Example 1. PH of the precipitate that was obtained was 4.98.

Then, a positive electrode material (A2) was obtained in the same manner as in Example 1.

The positive electrode material (A2) was evaluated in the same manner as in Example 1. The result is illustrated in Table 1.

In addition, a lithium ion secondary battery of Example 2 was prepared in the same manner as in Example 1 except that the positive electrode material (A2) was used.

The lithium ion secondary battery of Example 2 was evaluated in the same manner as in Example 1. The result is illustrated in Table 1.

Example 3

Lithium phosphate ($Li_3PO_4$), lithium hydroxide (LiOH), 2 moles of iron (II) sulfate ($FeSO_4$) and phosphoric acid ($H_3PO_4$) were mixed with 2 L of water in such a manner that in terms of a molar ratio, Li/Fe became 3.01, $Li_3PO_4$/Fe became 0.95, LiOH/Fe became 0.33, and $H_3PO_4$/Fe became 0.10, and the total amount became 4 L, thereby preparing a mixture in a uniform slurry state.

Subsequently, a precipitate was obtained in the same manner as in Example 1. PH of the precipitate that was obtained was 5.11.

Then, a positive electrode material (A3) was obtained in the same manner as in Example 1.

The positive electrode material (A3) was evaluated in the same manner as in Example 1. The result is illustrated in Table 1.

In addition, a lithium ion secondary battery of Example 3 was prepared in the same manner as in Example 1 except that the positive electrode material (A3) was used.

The lithium ion secondary battery of Example 3 was evaluated in the same manner as in Example 1. The result is illustrated in Table 1.

Example 4

Lithium phosphate ($Li_3PO_4$), lithium hydroxide (LiOH), 2 moles of iron (II) sulfate ($FeSO_4$) and phosphoric acid ($H_3PO_4$) were mixed with 2 L of water in such a manner that in terms of a molar ratio, Li/Fe became 3.01, $Li_3PO_4$/Fe became 0.95, LiOH/Fe became 0.36, and $H_3PO_4$/Fe became 0.11, and the total amount became 4 L, thereby preparing a mixture in a uniform slurry state.

Subsequently, a precipitate was obtained in the same manner as in Example 1. PH of the precipitate that was obtained was 5.25.

Then, a positive electrode material (A4) was obtained in the same manner as in Example 1.

The positive electrode material (A4) was evaluated in the same manner as in Example 1. The result is illustrated in Table 1.

In addition, a lithium ion secondary battery of Example 4 was prepared in the same manner as in Example 1 except that the positive electrode material (A4) was used.

The lithium ion secondary battery of Example 4 was evaluated in the same manner as in Example 1. The result is illustrated in Table 1.

Example 5

Lithium phosphate ($Li_3PO_4$), lithium hydroxide (LiOH), 2 moles of iron (II) sulfate ($FeSO_4$) and phosphoric acid ($H_3PO_4$) were mixed with 2 L of water in such a manner that in terms of a molar ratio, Li/Fe became 3.01, $Li_3PO_4$/Fe became 0.95, LiOH/Fe became 0.36, and $H_3PO_4$/Fe became 0.04, and the total amount became 4 L, thereby preparing a mixture in a uniform slurry state.

Subsequently, a precipitate was obtained in the same manner as in Example 1. PH of the precipitate that was obtained was 5.36.

Then, a positive electrode material (A5) was obtained in the same manner as in Example 1.

The positive electrode material (A5) was evaluated in the same manner as in Example 1. The result is illustrated in Table 1.

In addition, a lithium ion secondary battery of Example 5 was prepared in the same manner as in Example 1 except that the positive electrode material (A5) was used.

The lithium ion secondary battery of Example 5 was evaluated in the same manner as in Example 1. The result is illustrated in Table 1.

Example 6

Lithium phosphate ($Li_3PO_4$), lithium hydroxide (LiOH), 2 moles of iron (II) sulfate ($FeSO_4$) and phosphoric acid ($H_3PO_4$) were mixed with 2 L of water in such a manner that in terms of a molar ratio, Li/Fe became 3.01, $Li_3PO_4$/Fe became 0.95, LiOH/Fe became 0.38, and $H_3PO_4$/Fe became 0.04, and the total amount became 4 L, thereby preparing a mixture in a uniform slurry state.

Subsequently, a precipitate was obtained in the same manner as in Example 1. PH of the precipitate that was obtained was 5.40.

Then, a positive electrode material (A6) was obtained in the same manner as in Example 1.

The positive electrode material (A6) was evaluated in the same manner as in Example 1. The result is illustrated in Table 1.

In addition, a lithium ion secondary battery of Example 6 was prepared in the same manner as in Example 1 except that the positive electrode material (A6) was used.

The lithium ion secondary battery of Example 6 was evaluated in the same manner as in Example 1. The result is illustrated in Table 1.

Example 7

Lithium phosphate ($Li_3PO_4$), lithium hydroxide (LiOH), 2 moles of iron (II) sulfate ($FeSO_4$), manganese (II) sulfate ($MnSO_4$) and phosphoric acid ($H_3PO_4$) were mixed with 2 L of water in such a manner that in terms of a molar ratio, Li/(Fe+Mn) became 3.01, $Li_3PO_4$/(Fe+Mn) became 0.95, $FeSO_4$+$MnSO_4$ became 2 moles, Fe:Mn became 1:4, LiOH/(Fe+Mn) became 0.13, $H_3PO_4$/(Fe+Mn) became 0.04, and the total amount became 4 L, thereby preparing a mixture in a uniform slurry state.

Subsequently, a precipitate was obtained in the same manner as in Example 1. PH of the precipitate that was obtained was 5.21.

Then, a positive electrode material (A7) was obtained in the same manner as in Example 1.

The positive electrode material (A7) was evaluated in the same manner as in Example 1. The result is illustrated in Table 1.

In addition, a lithium ion secondary battery of Example 7 was prepared in the same manner as in Example 1 except that the positive electrode material (A7) was used.

The lithium ion secondary battery of Example 7 was evaluated in the same manner as in Example 1. The result is illustrated in Table 1.

Example 8

Lithium phosphate ($Li_3PO_4$), lithium hydroxide (LiOH), 2 moles of iron (II) sulfate ($FeSO_4$), manganese (II) sulfate ($MnSO_4$), cobalt sulfate ($CoSO_4$) and phosphoric acid ($H_3PO_4$) were mixed with 2 L of water in such a manner that in terms of a molar ratio, Li/(Fe+Mn+Co) became 3.01, $Li_3PO_4$/(Fe+Mn+Co) became 0.95, Fe:Mn:Co became 4:15:1, $FeSO_4$+$MnSO_4$+$CoSO_4$ became 2 mol, LiOH/(Fe+Mn+Co) became 0.13, $H_3PO_4$/(Fe+Mn+Co) became 0.04, and the total amount became 4 L, thereby preparing a mixture in a uniform slurry state.

Subsequently, a precipitate was obtained in the same manner as in Example 1. PH of the precipitate that was obtained was 5.17.

Then, a positive electrode material (A8) was obtained in the same manner as in Example 1.

The positive electrode material (A8) was evaluated in the same manner as in Example 1. The result is illustrated in Table 1.

In addition, a lithium ion secondary battery of Example 8 was prepared in the same manner as in Example 1 except that the positive electrode material (A8) was used.

The lithium ion secondary battery of Example 8 was evaluated in the same manner as in Example 1. The result is illustrated in Table 1.

Example 9

Lithium phosphate ($Li_3PO_4$), lithium hydroxide (LiOH), 2 moles of iron (II) sulfate ($FeSO_4$), manganese (II) sulfate ($MnSO_4$), zinc sulfate ($ZnSO_4$) and phosphoric acid ($H_3PO_4$) were mixed with 2 L of water in such a manner that in terms of a molar ratio, Li/(Fe+Mn+Zn) became 3.01, $Li_3PO_4$/(Fe+Mn+Zn) became 0.95, Fe:Mn:Zn became 4:15:1, $FeSO_4$+$MnSO_4$+$ZnSO_4$ became 2 moles, LiOH/(Fe+Mn+Zn) became 0.13, $H_3PO_4$/(Fe+Mn+Zn) became 0.04 and the total amount became 4 L, thereby preparing a mixture in a uniform slurry state.

Subsequently, a precipitate was obtained in the same manner as in Example 1. PH of the precipitate that was obtained was 5.36.

Then, a positive electrode material (A9) was obtained in the same manner as in Example 1.

The positive electrode material (A9) was evaluated in the same manner as in Example 1. The result is illustrated in Table 1.

In addition, a lithium ion secondary battery of Example 9 was prepared in the same manner as in Example 1 except that the positive electrode material (A9) was used.

The lithium ion secondary battery of Example 9 was evaluated in the same manner as in Example 1. The result is illustrated in Table 1.

Example 10

Lithium phosphate ($Li_3PO_4$), lithium hydroxide (LiOH), 2 moles of iron (II) sulfate ($FeSO_4$), manganese (II) sulfate ($MnSO_4$), cobalt sulfate ($CoSO_4$), zinc sulfate ($ZnSO_4$) and phosphoric acid ($H_3PO_4$) were mixed with 2 L of water in such a manner that in terms of a molar ratio, Li/(Fe+Mn+Co+Zn) became 3.01, $Li_3PO_4$/(Fe+Mn+Co+Zn) became 0.95, Fe:Mn:Zn:Co became 10:38:1:1, $FeSO_4$+$MnSO_4$+$CoSO_4$+$ZnSO_4$ became 2 moles, LiOH/(Fe+Mn+Co+Zn) became 0.13, $H_3PO_4$/(Fe+Mn+Co+Zn) became 0.04 and the total amount became 4 L, thereby preparing a mixture in a uniform slurry state.

Subsequently, a precipitate was obtained in the same manner as in Example 1. PH of the precipitate that was obtained was 5.28.

Then, a positive electrode material (A10) was obtained in the same manner as in Example 1.

The positive electrode material (A10) was evaluated in the same manner as in Example 1. The result is illustrated in Table 1.

In addition, a lithium ion secondary battery of Example 10 was prepared in the same manner as in Example 1 except that the positive electrode material (A10) was used.

The lithium ion secondary battery of Example 10 was evaluated in the same manner as in Example 1. The result is illustrated in Table 1.

Comparative Example 1

Lithium phosphate ($Li_3PO_4$) and 2 moles of iron (II) sulfate ($FeSO_4$) were mixed with 2 L of water in such a manner that in terms a molar ratio, Li/Fe became 3.01, $Li_3PO_4$/Fe became 0.95 and the total amount became 4 L, thereby preparing a mixture in a uniform slurry state.

Subsequently, a precipitate was obtained in the same manner as in Example 1. PH of the precipitate that was obtained was 3.98.

Then, a positive electrode material (C1) was obtained in the same manner as in Example 1.

The positive electrode material (C1) was evaluated in the same manner as in Example 1. The result is illustrated in Table 1.

In addition, a lithium ion secondary battery of Comparative Example 1 was prepared in the same manner as in Example 1 except that the positive electrode material (C1) was used.

The lithium ion secondary battery of Comparative Example 1 was evaluated in the same manner as in Example 1. The result is illustrated in Table 1.

Comparative Example 2

Lithium phosphate ($Li_3PO_4$) and 2 moles of iron (II) sulfate ($FeSO_4$) were mixed with 2 L of water in such a manner that in terms a molar ratio, Li/Fe became 3.01, $Li_3PO_4$/Fe became 0.95, and the total amount became 4 L, thereby preparing a mixture in a uniform slurry state.

Subsequently, a precipitate was obtained in the same manner as in Example 1. PH of the precipitate that was obtained was 5.72.

Then, a positive electrode material (D1) was obtained in the same manner as in Example 1.

The positive electrode material (D1) was evaluated in the same manner as in Example 1. The result is illustrated in Table 1.

In addition, a lithium ion secondary battery of Comparative Example 2 was prepared in the same manner as in Example 1 except that the positive electrode material (D1) was used.

The lithium ion secondary battery of Comparative Example 2 was evaluated in the same manner as in Example 1. The result is illustrated in Table 1.

Comparative Example 3

Lithium phosphate ($Li_3PO_4$) and 2 moles of iron (II) sulfate ($FeSO_4$) were mixed with 2 L of water in such a manner that in terms a molar ratio, Li/Fe became 3.01, $Li_3PO_4$/Fe became 0.95, $H_3PO_4$/Fe became 0.20, and the total amount became 4 L, thereby preparing a mixture in a uniform slurry state.

Subsequently, a precipitate was obtained in the same manner as in Example 1. PH of the precipitate that was obtained was 3.86.

Then, a positive electrode material (E1) was obtained in the same manner as in Example 1.

The positive electrode material (E1) was evaluated in the same manner as in Example 1. The result is illustrated in Table 1.

In addition, a lithium ion secondary battery of Comparative Example 3 was prepared in the same manner as in Example 1 except that the positive electrode material (E1) was used.

The lithium ion secondary battery of Comparative Example 3 was evaluated in the same manner as in Example 1. The result is illustrated in Table 1.

Comparative Example 4

Lithium phosphate ($Li_3PO_4$), lithium hydroxide (LiOH), iron (II) sulfate ($FeSO_4$), manganese (II) sulfate ($MnSO_4$) and phosphoric acid ($H_3PO_4$) were mixed with 2 L of water in such a manner that in terms of a molar ratio, Li/(Fe+Mn) became 3.01, $Li_3PO_4$/(Fe+Mn) became 0.95, $FeSO_4$+$MnSO_4$ became 2 moles, Fe:Mn became 1:4, LiOH/(Fe+Mn) became 0.50, $H_3PO_4$/(Fe+Mn) became 0.04 and the total amount became 4 L, thereby preparing a mixture in a uniform slurry state.

Subsequently, a precipitate was obtained in the same manner as in Example 1. PH of the precipitate that was obtained was 5.87.

Then, a positive electrode material (F1) was obtained in the same manner as in Example 1.

The positive electrode material (F1) was evaluated in the same manner as in Example 1. The result is illustrated in Table 1.

In addition, a lithium ion secondary battery of Comparative Example 4 was prepared in the same manner as in Example 1 except that the positive electrode material (F1) was used.

The lithium ion secondary battery of Comparative Example 4 was evaluated in the same manner as in Example 1. The result is illustrated in Table 1.

TABLE 1

| | Composition | LiOH/Fe | $H_3PO_4$/Fe | Obtained pH | 0.1 C discharge capacity (mAh/g) | 3 C discharge capacity (mAh/g) |
|---|---|---|---|---|---|---|
| Example 1 | $LiFePO_4$ | 0.13 | 0.04 | 4.98 | 157 | 139 |
| Example 2 | $LiFePO_4$ | 0.20 | 0.06 | 4.98 | 161 | 142 |
| Example 3 | $LiFePO_4$ | 0.33 | 0.10 | 5.11 | 156 | 137 |
| Example 4 | $LiFePO_4$ | 0.36 | 0.11 | 5.25 | 158 | 138 |
| Example 5 | $LiFePO_4$ | 0.36 | 0.04 | 5.36 | 155 | 135 |
| Example 6 | $LiFePO_4$ | 0.38 | 0.04 | 5.40 | 154 | 136 |
| Example 7 | $LiFe_{0.2}Mn_{0.8}PO_4$ | 0.13 | 0.04 | 5.21 | 152 | 137 |
| Example 8 | $LiFe_{0.2}Mn_{0.75}Co_{0.05}PO_4$ | 0.13 | 0.04 | 5.17 | 146 | 139 |
| Example 9 | $LiFe_{0.2}Mn_{0.75}Zn_{0.05}PO_4$ | 0.13 | 0.04 | 5.36 | 143 | 139 |
| Example 10 | $LiFe_{0.2}Mn_{0.76}Co_{0.02}Zn_{0.02}PO_4$ | 0.13 | 0.04 | 5.28 | 147 | 141 |
| Comparative Example 1 | $LiFePO_4$ | 0.00 | 0.00 | 3.98 | 158 | 132 |
| Comparative Example 2 | $LiFePO_4$ | 0.45 | 0.00 | 5.72 | 155 | 101 |

TABLE 1-continued

| | | | | | | |
|---|---|---|---|---|---|---|
| Comparative Example 3 | LiFePO$_4$ | | 0.00 | 0.20 | 3.86 | 154 | 110 |
| Comparative Example 4 | LiFe$_{0.2}$Mn$_{0.6}$PO$_4$ | | 0.50 | 0.04 | 5.87 | 143 | 97 |

| | Initial discharge capacity (mAh) | discharge capacity retention rate (%) | I(020)/ I(200) | Specific magnetization quantity (emu/g) | Amount of carbon (% by mass) | Specific surface area (m$^2$/g) |
|---|---|---|---|---|---|---|
| Example 1 | 8.73 | 84 | 2.80 | 0.36 | 0.99 | 17.5 |
| Example 2 | 8.71 | 86 | 2.95 | 0.34 | 0.98 | 16.5 |
| Example 3 | 8.69 | 83 | 3.14 | 0.42 | 0.93 | 19.1 |
| Example 4 | 8.76 | 82 | 4.22 | 0.39 | 0.95 | 19.6 |
| Example 5 | 8.60 | 81 | 3.70 | 0.51 | 0.94 | 19.3 |
| Example 6 | 8.00 | 80 | 3.65 | 0.63 | 0.96 | 19.7 |
| Example 7 | 8.54 | 81 | 3.39 | 0.48 | 1.12 | 11.0 |
| Example 8 | 8.35 | 83 | 3.61 | 0.49 | 1.03 | 10.3 |
| Example 9 | 8.31 | 83 | 3.82 | 0.44 | 0.98 | 11.4 |
| Example 10 | 8.35 | 82 | 3.77 | 0.46 | 1.04 | 10.7 |
| Comparative Example 1 | 8.80 | 75 | 2.61 | 0.73 | 1.01 | 7.03 |
| Comparative Example 2 | 8.43 | 60 | 2.50 | 0.78 | 0.91 | 9.90 |
| Comparative Example 3 | 8.72 | 62 | 2.55 | 0.80 | 1.23 | 9.83 |
| Comparative Example 4 | 8.31 | 63 | 2.43 | 0.89 | 0.97 | 8.87 |

From results in Table 1, it can be confirmed that when Examples 1 to 10 and Comparative Examples 1 to 4 were compared with each other, the lithium ion secondary batteries of Examples 1 to 10 have 135 or more of the discharge capacity at a discharge current of 3 C, and have 80% or more of the capacity retention rate which is a ratio of the capacity at a 300$^{th}$ cycle to the initial capacity. On the other hand, the lithium ion secondary batteries of Comparative Examples 1 to 4 have 132 or less of the discharge capacity at a discharge current of 3 C, and have 75% or less of the capacity retention rate which is a ratio of the capacity at a 300$^{th}$ cycle to the initial capacity.

According to the method of manufacturing the positive electrode material for a lithium ion secondary battery of the present invention, a plurality of highly reactive raw materials are used, and thus it is possible to reduce metal impurities which are residues. Accordingly, it is possible to reduce metal impurities in the positive electrode active material, and it is possible to make the positive electrode active material be very fine particles. As a result, a lithium ion secondary battery which includes a positive electrode which is prepared by using the positive electrode material for a lithium ion secondary battery manufactured by the manufacturing method has a high discharge capacity and a high energy density even at a low temperature or during a high-speed charge and discharge. Accordingly, the lithium ion secondary battery is also applicable to a next generation secondary battery for which a higher voltage, a higher energy density, higher load characteristics, and improved high-speed charge and discharge characteristics are furthermore expected, and the great effects can be achieved when the present invention is used for the next-generation secondary battery.

The invention claimed is:

1. A positive electrode material for a lithium ion secondary battery, comprising:
aggregated particles in which LiFe$_x$Mn$_{1-x-y}$M$_y$PO$_4$ particles are aggregated, wherein relationships of 0.05≤x≤1.0 and 0≤y≤0.14 are satisfied, and M represents at least one selected from the group consisting of Mg, Ca, Co, Sr, Ba, Ti, Zn, B, Al, Ga, In, Si, Ge, and a rare-earth element, and a surface of the LiFe$_x$Mn$_{1-x-y}$M$_y$PO$_4$ particles is coated with a carbonaceous film,
wherein
a specific magnetization quantity of the positive electrode material, which is measured under the conditions of room temperature, an excitation frequency of 80 Hz and at an applied magnetic field of 5 kOe, is 0.39 to 0.63 emu/g,
I(020)/I(200) of the positive electrode material is 3.14 to 5.00 wherein the I(020)/I(200) is a ratio of X-ray intensity I(020) of a (020) face in which a diffraction angle 2θ is in the vicinity of 29° in an X-ray diffraction pattern to X-ray intensity I(200) of a (200) face in which a diffraction angle 2θ is in the vicinity of 17° in an X-ray diffraction pattern,
a specific surface area of the positive electrode material is 10.3 to 19.3 m$^2$/g,
an average primary particle diameter of the primary particles of the positive electrode active material is 0.01 to 20 μm, and
the average secondary particle diameter of the aggregated particle is 0.5 to 100 μm,
the thickness of the carbonaceous film is 0.1 to 20 nm, and
the amount of carbon in the positive electrode material is 0.5 to 5.0% by mass.

2. A positive electrode for a lithium ion secondary battery, comprising:
a positive electrode current collector; and
a positive electrode mixture layer that is formed on the positive electrode current collector,
wherein the positive electrode mixture layer contains the positive electrode material for a lithium ion secondary battery according to claim 1.

3. A lithium ion secondary battery, comprising:
the positive electrode for a lithium ion secondary battery according to claim 2.

4. The positive electrode material according to claim 1, wherein the carbonaceous film is formed of thin film-shaped carbon.

5. The positive electrode material according to claim 1, wherein the aggregated particles are secondary particles, a surface of primary particles which are the $LiFe_xMn_{1-x-y}M_yPO_4$ particles is covered with thin film-shaped carbon, and carbon is interposed between the primary particles.

6. The positive electrode material according to claim 1, wherein the $LiFe_xMn_{1-x-y}M_yPO_4$ particles are $LiFePO_4$ particles.

7. A method of manufacturing the positive electrode material for a lithium ion secondary battery according to claim 1, comprising:

a first step of mixing $Li_3PO_4$, LiOH, $H_3PO_4$, an Fe source, a Mn source and an M source, wherein M represents at least one selected from the group consisting of Mg, Ca, Co, Sr, Ba, Ti, Zn, B, Al, Ga, In, Si, Ge, and a rare-earth element, to prepare raw material slurry; and a second step of subjecting the raw material slurry to a reaction under a high temperature and a high pressure, wherein in the first step, mixing amounts of Li and P satisfy relationships of $3.00 \leq Li/(Fe+Mn+M) \leq 3.10$ and $1.00 \leq P/(Fe+Mn+M) \leq 1.10$, respectively, mixing amounts of LiOH and $H_3PO_4$ satisfy relationships of $0 < LiOH/(Fe+Mn+M) < 0.40$ and $0 < H_3PO_4/(Fe+Mn+M) < 0.15$, respectively, the amount of $Li_3PO_4$, LiOH, $H_3PO_4$, the Fe source, the Mn source, and the M source in the raw material slurry is 0.5 to 1.5 mol/L in terms of $LiFe_xMn_{1-x-y}M_yPO_4$, wherein $0.05 \leq x \leq 1.0$, and $0 \leq y \leq 0.14$, and the pH of the raw material slurry is 4.0 to 5.5.

* * * * *